US008899804B2

(12) United States Patent
Guo et al.

(10) Patent No.: US 8,899,804 B2
(45) Date of Patent: Dec. 2, 2014

(54) LED HEADLAMP FOR MOTOR VEHICLE

(76) Inventors: Tinglin Guo, Tieling (CN); Derun Liu, Tieling (CN)

( * ) Notice: Subject to any disclaimer, the term of this patent is extended or adjusted under 35 U.S.C. 154(b) by 119 days.

(21) Appl. No.: 13/582,980

(22) PCT Filed: Sep. 7, 2010

(86) PCT No.: PCT/CN2010/076657
§ 371 (c)(1),
(2), (4) Date: Sep. 5, 2012

(87) PCT Pub. No.: WO2011/140769
PCT Pub. Date: Nov. 17, 2011

(65) Prior Publication Data

US 2013/0051051 A1 Feb. 28, 2013

(30) Foreign Application Priority Data

May 12, 2010 (CN) .......................... 2010 1 0168924

(51) Int. Cl.
*B60Q 1/04* (2006.01)
*F21V 29/00* (2006.01)
*F21V 7/00* (2006.01)
*F21S 8/10* (2006.01)

(52) U.S. Cl.
CPC .................................. *F21S 48/1154* (2013.01)
USPC ............................ 362/516; 362/549; 362/545

(58) Field of Classification Search
USPC .......................................... 362/516, 545, 549
See application file for complete search history.

(56) References Cited

U.S. PATENT DOCUMENTS

2008/0239741 A1* 10/2008 Nakada et al. ................ 362/507

* cited by examiner

*Primary Examiner* — Joseph L Williams
*Assistant Examiner* — Brenitra M Lee

(57) ABSTRACT

An LED headlamp for motor vehicle includes a condenser frame (1), a condenser (2) located in front of the condenser frame (1), and an LED holder (3) located in back of the condenser frame (1). A plurality of LEDs are located inside the LED holder (3) and at one side of the condenser focal plane (8) which is far away the condenser (2). The curve lighting, the low beam lighting and the high beam lighting can be achieved in a same device. The present invention has small occupied space and low cost.

20 Claims, 2 Drawing Sheets

LED HEADLAMP FOR MOTOR VEHICLE

CROSS REFERENCE TO RELATED APPLICATIONS

This application is a National Stage of International Application No. PCT/CN10/76657 filed Sep. 7, 2010, and claims priority under 35 U.S.C. §119 to Chinese Patent Application 201010168924.4 filed May 12, 2010, the disclosures of which are herein incorporated by reference in their entirety.

BACKGROUND OF THE PRESENT INVENTION

1. Field of Invention

The present invention relates to a headlamp, and more particularly to an LED motor vehicle headlamp for automobile lighting, which belongs to the automobile lighting field.

2. Description of Related Arts

In the past, the automobile illuminates by a light source, the light source is located on the focus of the reflector. With the development of science and technology, the LED is also used in the automobile lighting. However, at present, the LED is not as high as high-pressure xenon discharge lamp in electro-optical conversion effect, the surface brightness and the device operating temperature. Therefore, there are lots of difficulties in the practical application. Now the LED is used in the headlamp as a light source, wherein the low beam lighting, the high beam lighting and the curve lighting are separated. Furthermore, the low beam and the high beam are superimposed by more than two projections so as to reach the standard illumination distribution, which will inevitably cause the large volume, high difficulties in processing and high cost. As a result, the LED can't be commercialized as a light source. In addition, at present, the diode divergence angles are more than 120° and the energy is a bit dispersive. If the diode is applied, the energy of the diode must be gathered. The diode is a heating element. It is low in heating capacity and fast in temperature rising. It can efficiently light only when it works in a certain temperature range, otherwise it will be burned-out. Therefore, there is a problem that how to cool the LED.

SUMMARY OF THE PRESENT INVENTION

To solve the above technical problem, the present invention provides an LED headlamp for motor vehicle, with the purpose of reducing the cost and improving the service life.

Accordingly, in order to accomplish the above object, the present invention provides an LED (light-emitting diode) headlamp for motor vehicle comprising a condenser frame and a condenser located in front of the condenser frame, characterized in that an LED holder is located in back of the condenser frame, a lighting LED unit is located inside the LED holder and at the other side of a condenser focal plane.

The lighting LED unit comprises a curve lighting LED group, a low beam lighting LED group and/or a high beam lighting LED group, wherein the curve lighting LED group is located at two sides of the LED holder, the low beam lighting LED group is located above a condenser centerline inside the LED holder, a high beam lighting LED group is located below the condenser centerline inside the LED holder, and the LED holder is parallel to the condenser.

A baffle is located at the condenser focal plane between the condenser and a back end of the condenser frame, a shadow shield is located at two sides of the baffle and fixed to an inner wall of the condenser frame, the baffle is located below the condenser centerline and controlled by a driving device, and the driving device is electromagnet or motor.

The high beam lighting LED group is located below the condenser centerline between the baffle and the condenser, and a reflector is located between the high beam lighting LED group and the baffle.

Each of the curve lighting LED group, the low beam lighting LED group and the high beam lighting LED group comprises at least one LED.

A connection stent is located at two sides outside the condenser frame, and fixed with a light box frame, a front end of the light box frame is fixed with the condenser frame and a back end of the light box frame is fixed with the LED holder.

A radiator is located outside the LED holder, a small condenser is located in front of the LED, and a distance from the small condenser to the condenser focal plane is 1-5 mm.

Two heat dissipation conductive films are located in back of the LED, and an insulating cement is provided between the two heat dissipation conductive films.

A conductive adhesive or solder is provided between every heat dissipation conductive film and the LED, an LED electrode on the LED is fixed with the conductive adhesive or solder, and every heat dissipation conductive film is connected with a wire.

A type, power, number and position distribution of the curve lighting LED group, the low beam lighting LED group and the high beam lighting LED group are corresponding to a standard illumination distribution.

The beneficial effects of the present invention are as follows. The small condenser is installed in front of the LED, which concentrates the energy of the LED and improves the energy efficiency to double of before. The LED is a surface light source, so the reflection bowl of the tradition lighting is saved. The energy of the diode can project to the lighting area via the condenser only by installing every LED (light emitting diode) near the focal plane of the condenser according to the standard illumination distribution. The curve lighting LED group, the low beam lighting LED group and the high beam lighting LED group are one-to-one corresponding to the illuminated positions. The heat of the LED is transferred to the radiator, the radiator dissipates more than 80% heat outside the lamp box for reducing the temperature inside the lamp box under 50° C., thus providing the premise for the use of organic glass or resin material. Furthermore, the present invention can complete the curve lighting, the low beam lighting and the high beam lighting in a device, thus reducing the occupied space and the cost, and improving the lighting effect.

Figure 1:
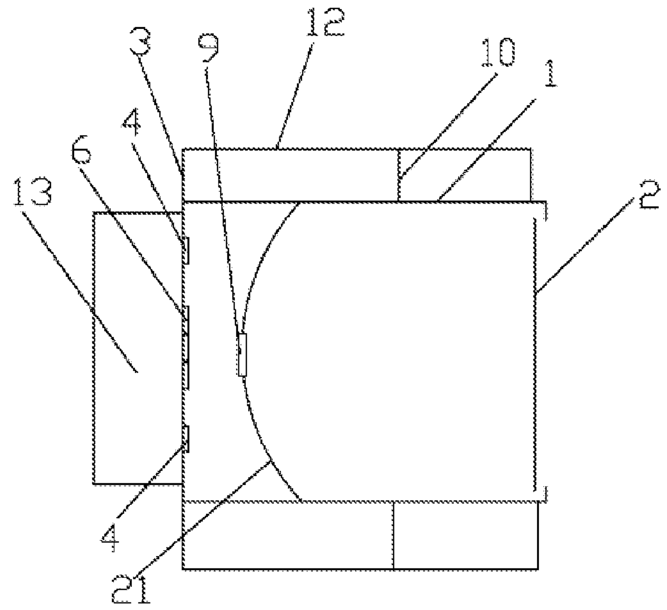
FIG. 1 is a top view of the present invention.

In the drawings: 1, condenser frame; 2, condenser; 3, LED holder; 4, curve lighting LED group; 5, condenser centerline; 6, low beam lighting LED group; 7, high beam lighting LED group; 8, condenser focal plane; 9, baffle; 10, connection stent; 11, driving device; 12, light box frame; 13, radiator; 14, small condenser; 15, heat dissipation conductive film; 16, insulating cement; 17, conductive adhesive; 18, LED electrode; 19, wire; 20, reflector; 21, shadow shield; 22, LED

DETAILED DESCRIPTION OF THE PREFERRED EMBODIMENT

The present invention is further explained in detail with the accompanying drawings.

Embodiment 1

Achieve the Combined Lighting of Curve, Low Beam and High Beam

Figure 2:
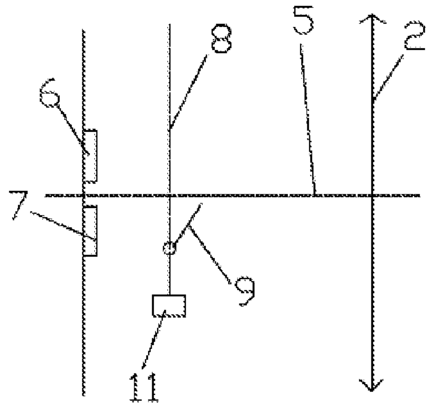
FIG. 2 is a side-view principle diagram of the present invention.
Figure 4:
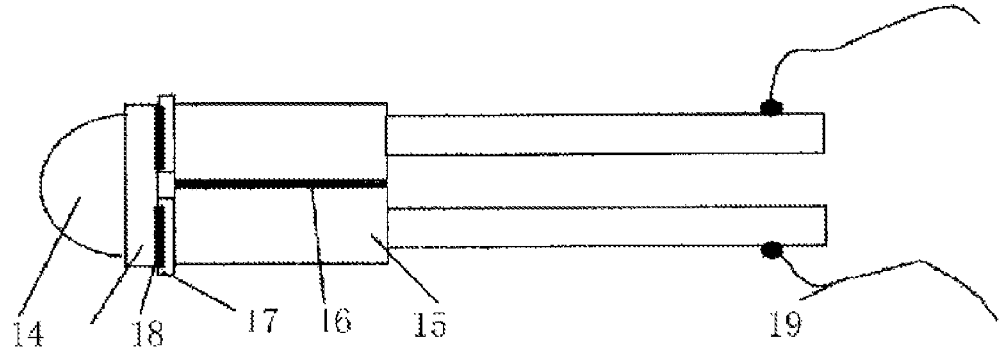
FIG. 4 is a structural diagram of the LED.

As shown in FIGS. 1, 2 and 4, an LED (light-emitting diode) headlamp for motor vehicle is illustrated, which comprises a condenser frame 1, a condenser 2 located in front of the condenser frame 1, an LED holder 3 located in back of the condenser frame 1 and parallel to the condenser, and a lighting LED unit located inside the LED holder 3 and at the other side of a condenser focal plane 8. The lighting LED unit comprises a curve lighting LED group 4, a low beam lighting LED group 6 and a high beam lighting LED group 7, wherein the LEDs 22 of the curve lighting LED group 4, the low beam lighting LED group 6 and the high beam lighting LED group 7 are vertically located at the LED holder. In this embodiment of the present invention, two curve lighting LED groups 4 are respectively located above two sides of the condenser centerline 5 of the LED holder 3. Every curve lighting LED group 4 consists of one LED. A low beam lighting LED group 6 is located above the condenser centerline 5 inside the LED holder 3. The low beam lighting LED group 6 consists of one to six LEDs 22. In this embodiment of the present invention, the low beam lighting LED group 6 consists of one LED 22. A high beam lighting LED group 7 is located below the condenser centerline 5 inside the LED holder. The high beam lighting LED group 7 consists of one to three LEDs. In this embodiment of the present invention, the high beam lighting LED group 7 consists of one LED 22. A baffle 9 is located at the condenser focal plane 8 which is between the condenser 2 and a back end of the condenser frame 1. While low beam lighting, the baffle 9 will be closed, a shadow shield 21 is located at two sides of the baffle 9, and fixed to an inner wall of the condenser frame 1. The baffle 9 is located below the condenser centerline 5 and controlled by a driving device 11. The driving device is an electromagnet. A connection stent 10 is located at two sides outside the condenser frame 1 and fixed with a light box frame 12. A front end of the light box frame 12 is fixed with the condenser frame 1, and a back end of the light box frame 12 is fixed with the LED holder 3. A radiator 13 is located outside the LED holder 3. A small condenser 14 is located in front of every LED 22. A distance from the small condenser to the condenser focal plane is 1-5 mm. Two heat dissipation conductive films 15 are located in back of the LED 22. An insulating cement 16 is provided between the two heat dissipation conductive films 15. A conductive adhesive 17 or solder is provided between every heat dissipation conductive film 15 and the LED 22. An LED electrode 18 on the LED 22 is fixed with the conductive adhesive 17 or solder. Every heat dissipation conductive film 15 is connected with a wire 19.

Embodiment 2

Figure 3:
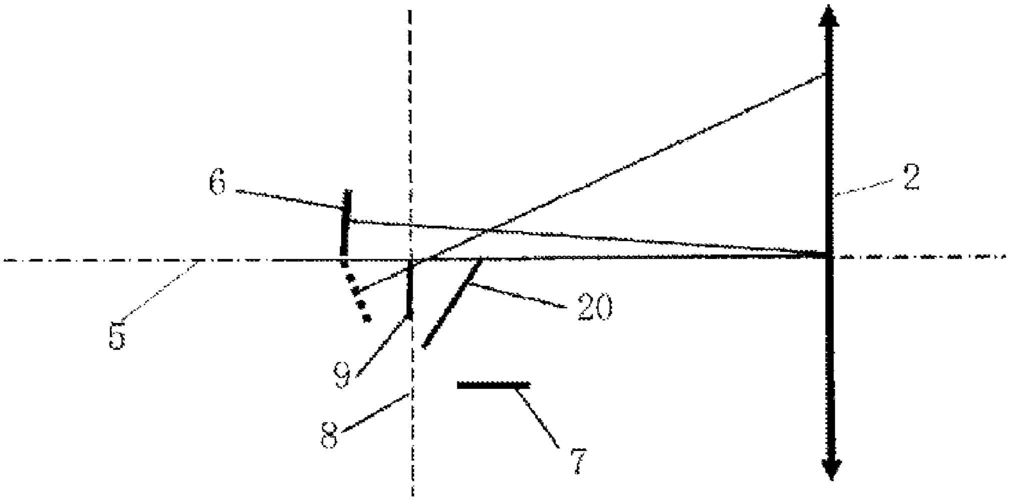
FIG. 3 is a side-view principle diagram according to a second embodiment of the present invention.

The Baffle is Fixed while Switching Between the Low Beam Lighting and the High Beam Lighting As shown in FIG. 3, the high beam lighting LED group 7 of the embodiment 1 is located below the condenser centerline 5 which is between the baffle 9 and the condenser 2. A reflector 20 is located between the high beam lighting LED group 7 and the baffle 9. In this embodiment of the present invention, the low beam lighting LED group 6 consists of three LEDs 22, the high beam lighting LED group 7 consists of two LEDs 22, and the curve lighting LED group 4 consists of two LEDs. The others are the same as the embodiment 1. While low beam lighting, the high beam lighting LED group is turned off, the edge image of the baffle is on the screen. While high beam lighting, the high beam lighting LED group is turned on, the light is reflected by the reflector and projected by the condenser, which is just like lighting from the image points, overlying on the low beam and flooding the baffle image. The low beam and the high beam can be switched by turning on/off the high beam LED group without moving the baffle.

Embodiment 3

Achieve Curve Lighting

An LED headlamp for motor vehicle comprises a condenser frame 1, a condenser 2 located in front of the condenser frame 1, an LED holder 3 located in back of the condenser frame 1, and a lighting LED unit located inside the LED holder 3 and at the other side of the condenser focal plane 8. The lighting LED unit is a curve lighting LED group 4 located at two sides of the LED holder 3. In this embodiment of the present invention, the curve beam lighting LED group 4 consists of three LEDs. A connection stents 10 is located at two sides outside the condenser frame 1 and fixed with a light box frame 12. A front end of the light box frame 12 is fixed with the condenser frame 1, and a back end of the light box frame 12 is fixed with the LED holder 3. A radiator 13 is located outside the LED holder 3. A small condenser 14 is located in front of every LED 22. A distance from the small condenser to the condenser focal plane is 1-5 mm. Two heat dissipation conductive films 15 are located in back of the LED 22. An insulating cement 16 is provided between the two heat dissipation conductive films 15. A conductive adhesive 17 or solder is provided between every heat dissipation conductive film 15 and the LED 22. An LED electrode 18 on the LED 22 is fixed with the conductive adhesive 17 or solder. Every heat dissipation conductive film 15 is connected with a wire 19.

Embodiment 4

Achieve High Beam Lighting

An LED headlamp for motor vehicle comprises a condenser frame 1, a condenser 2 located in front of the condenser frame 1, an LED holder 3 located in back of the condenser frame 1, and a lighting LED unit located inside the LED holder 3 and at the other side of the condenser focal plane 8. The lighting LED unit is a high beam lighting LED group 7 located below the condenser centerline 5 inside the LED holder 3. In this embodiment of the present invention, the high beam lighting LED group 7 consists of three LEDs 22. A connection stent 10 is located at two sides outside the condenser frame 1 and fixed with a light box frame 12. A front end of the light box frame 12 is fixed with the condenser frame 1, and a back end of the light box frame 12 is fixed with the LED holder 3. A radiator 13 is located outside the LED holder 3. A small condenser 14 is located in front of every LED 22. A distance from the small condenser to the condenser focal plane is 1-5 mm. Two heat dissipation conductive films 15 are located in back of the LED 22. An insulating cement 16 is provided between the two heat dissipation conductive films 15. A conductive adhesive 17 or solder is provided between every heat dissipation conductive film 15 and the LED 22. An LED electrode 18 on the LED 22 is fixed with the conductive adhesive 17 or solder. Every heat dissipation conductive film 15 is connected with a wire 19.

Embodiment 5

Achieve Low Beam Lighting

An LED headlamp for motor vehicle comprises a condenser frame 1, a condenser 2 located in front of the condenser frame 1, an LED holder 3 located in back of the condenser frame 1, and a lighting LED unit located inside the LED holder 3 and at the other side of the condenser focal plane 8. The lighting LED unit is a low beam lighting LED group 6 located above the condenser centerline 5 inside the LED holder 3. In this embodiment of the present invention, the low beam lighting LED group 6 consists of six LEDs 22. A baffle 9 is located at the condenser focal plane 8 which is between the condenser 2 and a back end of the condenser frame 1. A shadow shield 21 is located at two sides of the baffle 9, and fixed to an inner wall of the condenser frame 1. The baffle 9 is located below the condenser centerline 5 and controlled by a driving device 11. The driving device is a motor. A connection stent 10 is located at two sides outside the condenser frame 1 and fixed with a light box frame 12. A front end of the light box frame 12 is fixed with the condenser frame 1, and a back end of the light box frame 12 is fixed with the LED holder 3. A radiator 13 is located outside the LED holder 3. A small condenser 14 is located in front of every LED 22. A distance from the small condenser to the condenser focal plane is 1-5 mm. Two heat dissipation conductive films 15 are located in back of the LED 22. An insulating cement 16 is provided between the two heat dissipation conductive films 15. A conductive adhesive 17 or solder is provided between every heat dissipation conductive film 15 and the LED 22. An LED electrode 18 on the LED 22 is fixed with the conductive adhesive 17 or solder. Every heat dissipation conductive film 15 is connected with a wire 19.

The working principle of the present invention is described as follows. When the automobile makes a turn, the curve lighting LED group will work; when the automobile turns left, the right curve lighting LED group will work; when the automobile turns right, the left curve lighting LED group will work. The low beam lighting LED group and the baffle will work when low beam is in need; the high beam lighting LED group will work when high beam is in need, thus achieving the high beam lighting. When the LEDs from the curve lighting LED group, the low beam lighting LED group and the high beam lighting LED group are open, every LED forms a spot on the focal plane of the condenser, the continuous spots form a light band, and then form lighting in the corresponding area via the condenser. The type, power, number and position distribution of the LED are corresponding to the standard illumination distribution. For example, all LEDs from the low beam lighting LED group form a continuous light band on the focal plane of the condenser, and then this light band irradiates in the range required by low beam via the condenser. However, all LEDs from the low beam lighting LED group can be one row or two rows on the LED holder, which are arranged according to the requirements.

What is claimed is:

1. An LED (light-emitting diode) headlamp for motor vehicle, comprising:

a condenser frame;

a first condenser located in front of the condenser frame and having a condenser focal plane and a condenser centerline;

an LED holder located at a back end of the condenser frame and parallel to the first condenser;

a lighting LED unit located inside the LED holder, wherein the lighting LED unit comprises:

a curve lighting LED groups located above the condenser centerline at a side of the LED holder;

a low beam lighting LED group located above the condenser centerline inside the LED holder; and a high beam lighting LED group;

a baffle located at the condenser focal plane between the first condenser and the back end of the condenser frame, located below the condenser centerline and controlled by a driving device;

a shadow shield located at two sides of the baffle and fixed to an inner wall of the condenser frame; and a reflector located between the high beam lighting LED group and the baffle, wherein the high beam lighting LED group is located below the condenser centerline between the baffle and the condenser.

2. The LED headlamp, as recited in claim 1, each of the curve lighting LED group, the low beam lighting LED group and the high beam lighting LED group comprises at least one LED.

3. The LED headlamp, as recited in claim 2, wherein the LED is perpendicular to the LED holder.

4. The LED headlamp, as recited in claim 1, further comprising a connection stent located at two sides outside the condenser frame, a light box frame fixed with the connection stent, wherein a front end of the light box frame is fixed with the condenser frame and a back end of the light box frame is fixed with the LED holder.

5. The LED headlamp, as recited in claim 2, further comprising a connection stent located at two sides outside the condenser frame, a light box frame fixed with the connection stent, wherein a front end of the light box frame is fixed with the condenser frame and a back end of the light box frame is fixed with the LED holder.

6. The LED headlamp, as recited in claim 3, further comprising a connection stent located at two sides outside the condenser frame, a light box frame fixed with the connection stent, wherein a front end of the light box frame is fixed with the condenser frame and a back end of the light box frame is fixed with the LED holder.

7. The LED headlamp, as recited in claim 2, further comprising a radiator located outside the LED holder, and a second condenser located in front of the LED, wherein a distance from the second condenser to the condenser focal plane is 1-5 mm.

8. The LED headlamp, as recited in claim 3, further comprising a radiator located outside the LED holder, and a second condenser located in front of the LED, wherein a distance from the second condenser to the condenser focal plane is 1-5 mm.

9. The LED headlamp, as recited in claim 5, further comprising a radiator located outside the LED holder, and a second condenser located in front of the LED, wherein a distance from the second condenser to the condenser focal plane is 1-5 mm.

10. The LED headlamp, as recited in claim 6, further comprising a radiator located outside the LED holder, and a second condenser located in front of the LED, wherein a distance from the second condenser to the condenser focal plane is 1-5 mm.

11. The LED headlamp, as recited in claim 7, further comprising two heat dissipation conductive films located at a back of the LED, and an insulating cement provided between the two heat dissipation conductive films.

12. The LED headlamp, as recited in claim 8, further comprising two heat dissipation conductive films located at a back of the LED, and an insulating cement provided between the two heat dissipation conductive films.

13. The LED headlamp, as recited in claim 9, further comprising two heat dissipation conductive films located at a back of the LED, and an insulating cement provided between the two heat dissipation conductive films.

14. The LED headlamp, as recited in claim 10, further comprising two heat dissipation conductive films located at a back of the LED, and an insulating cement provided between the two heat dissipation conductive films.

15. The LED headlamp, as recited in claim 11, further comprising a conductive adhesive or solder provided between each of the heat dissipation conductive films and the LED, wherein an LED electrode on the LED is fixed with the conductive adhesive or solder, and each of the heat dissipation conductive films is connected with a wire.

16. The LED headlamp, as recited in claim 12, further comprising a conductive adhesive or solder provided between each of the heat dissipation conductive films and the LED, wherein an LED electrode on the LED is fixed with the conductive adhesive or solder, and each of the heat dissipation conductive films is connected with a wire.

17. The LED headlamp, as recited in claim 13, further comprising a conductive adhesive or solder provided between each of the heat dissipation conductive films and the LED, wherein an LED electrode on the LED is fixed with the conductive adhesive or solder, and each of the heat dissipation conductive films is connected with a wire.

18. The LED headlamp, as recited in claim 14, further comprising a conductive adhesive or solder provided between each of the heat dissipation conductive films and the LED, wherein an LED electrode on the LED is fixed with the conductive adhesive or solder, and each of the heat dissipation conductive films is connected with a wire.

19. The LED headlamp, as recited in claim 17, wherein a type, power, number and position distribution of the curve lighting LED group, the low beam lighting LED group and the high beam lighting LED group are corresponding to a standard illumination distribution.

20. The LED headlamp, as recited in claim 18, wherein a type, power, number and position distribution of the curve lighting LED group, the low beam lighting LED group and the high beam lighting LED group are corresponding to a standard illumination distribution.

* * * * *